United States Patent
Rothermel et al.

(10) Patent No.: US 7,199,957 B2
(45) Date of Patent: Apr. 3, 2007

(54) WRITE HEAD ALIGNMENT FOR FULL AMPLITUDE TIME-BASED SERVO

(75) Inventors: Stephen J. Rothermel, Roseville, MN (US); Richard E. Jewett, Minneapolis, MN (US)

(73) Assignee: Imation Corp., Oakdale, MN (US)

( * ) Notice: Subject to any disclaimer, the term of this patent is extended or adjusted under 35 U.S.C. 154(b) by 297 days.

(21) Appl. No.: 10/813,495

(22) Filed: Mar. 30, 2004

(65) Prior Publication Data

US 2005/0219734 A1    Oct. 6, 2005

(51) Int. Cl.
  *G11B 21/02*    (2006.01)
  *G11B 5/584*   (2006.01)
(52) U.S. Cl. ...................... 360/48; 360/77.12
(58) Field of Classification Search ............... None
  See application file for complete search history.

(56) References Cited

U.S. PATENT DOCUMENTS

| | | | |
|---|---|---|---|
| 4,839,763 A * | 6/1989 | Matsuzawa | 360/126 |
| 4,996,609 A * | 2/1991 | Joannou | 360/57 |
| 5,689,384 A | 11/1997 | Albrecht et al. | |
| 5,930,065 A | 7/1999 | Albrecht et al. | |
| 6,021,013 A | 2/2000 | Albrecht et al. | |
| 6,222,698 B1 | 4/2001 | Barndt et al. | |
| 6,462,904 B1 | 10/2002 | Albrecht et al. | |
| 6,700,729 B1 * | 3/2004 | Beck et al. | 360/76 |
| 2005/0157422 A1 * | 7/2005 | Dugas et al. | 360/121 |
| 2005/0168869 A1 * | 8/2005 | Dugas et al. | 360/118 |

OTHER PUBLICATIONS

Co-pending U.S. Appl. No. 10/328,460, filed Dec. 23, 2002, Yung Yip and Richard W. Molstad, entitled "Full Amplitude Time-Based Servopositioning Signals".

* cited by examiner

*Primary Examiner*—Andrea Wellington
*Assistant Examiner*—Varsha A. Kapadia
(74) *Attorney, Agent, or Firm*—Eric D. Levinson

(57) ABSTRACT

The invention is directed to a servo writing apparatus having accurate alignment of write gaps of servo write heads. In particular, the write gaps substantially align in a servo channel corresponding to a servo band of a magnetic data storage tape. The servo band is fully magnetized (a.k.a. DC erased) in one direction by a direct current (DC) magnetic field across the write gap of one of the servo write heads. Time-based servo markings magnetized in a second direction are recorded on the fully magnetized servo band by a pulsed magnetic field across the write gaps of the other servo write head. The servo write heads may be mounted in a mounting structure within the servo writing apparatus. Maintaining a large mounting structure width to servo write head separation distance ratio improves write gap alignment accuracy, which assures full servo signal strength across the servo band without magnetizing adjacent data bands.

16 Claims, 12 Drawing Sheets

WRITE HEAD ALIGNMENT FOR FULL AMPLITUDE TIME-BASED SERVO

TECHNICAL FIELD

The invention relates to data storage media and, more particularly, to data storage tape that makes use of time-based servo information.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks.

Servo patterns refer to signals or other recorded marks on the medium that are used for tracking purposes. In magnetic tape, the servo patterns are recorded in specialized tracks on the medium called "servo tracks" to provide reference points relative to the data tracks. A servo controller interprets detected servo patterns and generates position error signals. The position error signals are used to adjust the lateral distance of the read/write head relative to the data tracks so that the read/write head is properly positioned along the data tracks for effective reading and/or writing of the data to the data tracks. A plurality of servo tracks may be defined in a servo band. Most magnetic media include a plurality of servo bands, with data tracks being located between the servo bands. The data tracks located between the servo bands may be defined as a data band. Time-based servo techniques refer to servo techniques that make use of time variables. Time-based servo techniques are particularly effective for magnetic tape, which typically feeds past transducer heads at a constant velocity. For example, N-shaped servo markings, servo markings such as "<<< >>>" or "//// \\\\," or the like, have been developed for time-based servo techniques. Such markings are typically formed in a servo track of the magnetic tape.

When time-based servo techniques are used, the time offset between detection of two or more servo marks can be translated into a position error signal, which defines a lateral distance of the transducer head relative to a data track. For example, given a constant velocity of magnetic tape formed with marking "/\", the time between detection of "/" and "\" becomes larger when the servo head is positioned towards the bottom of marking "/\" and smaller if the servo head is positioned towards the top of marking "/\". Given a constant velocity of magnetic tape, a defined time period between detected servo signals may correspond to a center of marking "/\". By locating the center of marking "/\", a known distance between the center of the servo track and the data tracks can be identified.

The data storage capacity of the magnetic tape can be increased by increasing the number of data tracks and corresponding servo tracks. However, as the number of data and servo tracks increases, the tracks usually become narrower and more crowded on the surface of the data storage tape. Track width reduction may decrease a signal-to-noise ratio (SNR) of the recording system. The signals detected by the servo controller are proportional to the system SNR, therefore, increasing the storage capacity can cause the strength of servo signals to decrease.

SUMMARY

In general, the invention is directed to a servo writing apparatus having accurate alignment of write gaps of servo write heads. In particular, the write gaps substantially align in a servo channel corresponding to a servo band of a magnetic data storage tape passing relative the servo writing apparatus. The servo band is fully magnetized (a.k.a. DC erased) in one direction by a direct current (DC) magnetic field across the write gap of one of the servo write heads. Time-based servo markings oriented in a second direction are recorded on the fully magnetized servo band by a pulsed magnetic field across the write gaps of the other servo write head. Accurately aligning the write gaps of the servo write heads increases servo signal strength and creates a uniform servo signal amplitude across the servo band, which can improve accuracy of position error signals. Moreover, aligning the write gaps in the servo writing apparatus increases data head to data band position accuracy.

In some embodiments, the invention comprises two separate servo write heads mounted in a mounting structure such that the write gaps of the servo write heads align with each other. In other embodiments, the invention comprises two servo write heads defined by a single core such that the servo write gaps of the servo write heads align with each other. In either embodiment, the servo write gaps of the servo write heads are aligned to within less than 10 micrometers.

In one embodiment, the invention is directed to a servo writing apparatus comprising a first servo write head comprising a first write gap and a second servo write head comprising one or more second write gaps. The first write gap substantially orients magnetic particles of magnetic tape in a first direction. The second write gaps are oriented to define a time-based servo pattern oriented in a second direction on the magnetic tape. The first write gap and the second write gaps define a servo channel corresponding to a servo band on the magnetic tape, and the first write gap and the second write gaps are substantially aligned in the servo channel within less than 10 micrometers.

In another embodiment, the invention is directed to a servo writing apparatus comprising a core that defines a first servo write head and a second servo write head. The first servo write head includes a first write gap to substantially magnetize magnetic particles of magnetic tape in a first direction. The second servo write head includes one or more second write gaps oriented to define a time-based servo pattern magnetized in a second direction on the magnetic tape. The first write gap and the second write gaps define a servo channel corresponding to a servo band on the magnetic tape, and the first write gap and the second write gaps are substantially aligned in the servo channel to within less than 10 micrometers.

In a further embodiment, the invention is directed to a method comprising aligning a first write gap of a first servo write head and one or more second write gaps of a second servo write head. The first write gap substantially magnetizes magnetic particles of magnetic tape in a first direction. The second write gaps are oriented to define a time-based servo pattern magnetized in a second direction on the magnetic tape. The first write gap and the second write gaps are aligned such that the first write gap and the second write gaps define a servo channel corresponding to a servo band of the magnetic tape and the first write gap and the second write gaps are aligned in the servo channel to within less than 10 micrometers.

The invention may include one or more advantages. For example, alignment accuracy of the write gaps of the servo write heads relative to each other may improve the quality of time-based servo signals recorded by the servo writing apparatus. In particular, the improved alignment makes the position error signal more accurate. In addition, the improved alignment can make the servo cross band amplitude more uniform and avoid increased peak shift in the data signal. Moreover, the improved alignment reduces a probability of writing DC signals and servo markings in data bands on the magnetic data storage tape, rather than the servo bands.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
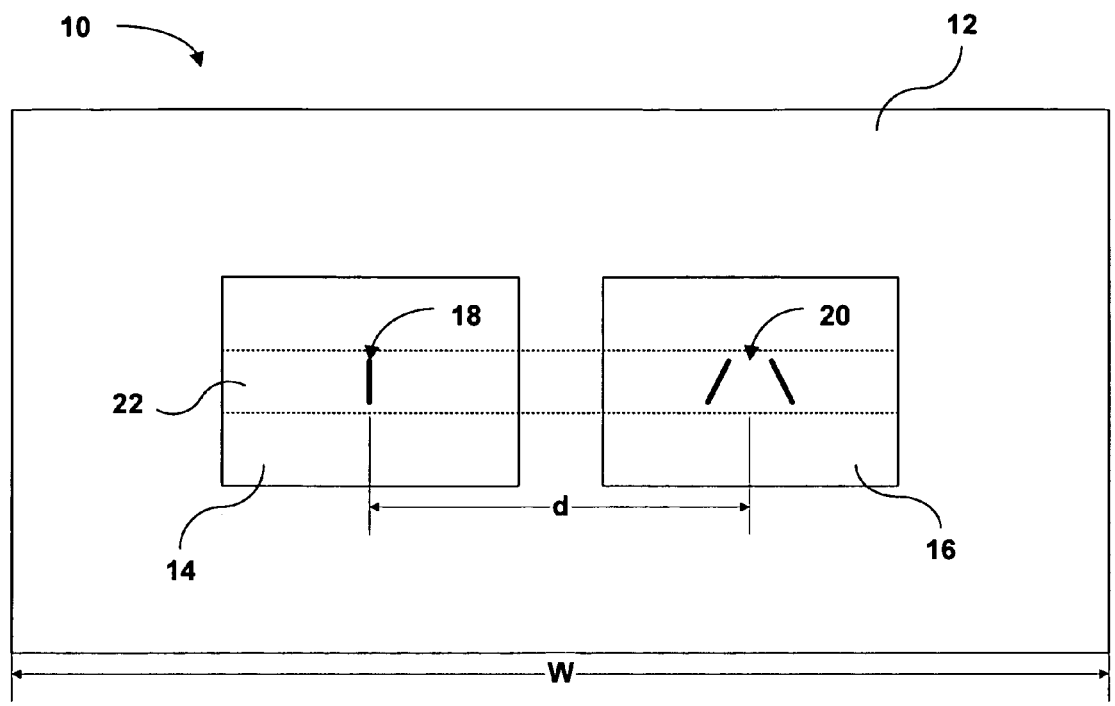
FIG. 1 is a schematic diagram illustrating a servo writing apparatus to write time-based servo patterns on magnetic data storage tape.

FIG. 1 is a schematic diagram illustrating a servo writing apparatus 10 to write time-based servo patterns on magnetic data storage tape. Servo writing apparatus 10 includes a first servo write head 14 and a second servo write head 16. First servo write head 14 comprises a first write gap 18 to substantially magnetize magnetic particles of the magnetic data storage tape in a first direction. Second servo write head 16 comprises second write gaps 20 oriented to define a time-based servo pattern magnetized in a second direction on the magnetic tape. First write gap 18 and second write gaps 20 define a servo channel 22, which corresponds to a servo band of the magnetic data storage tape. A plurality of servo tracks may be defined in the servo band. First write gap 18 and second write gaps 20 are aligned in servo channel 22 to within 10 micrometers, more preferably to within 5 micrometers, more preferably to within 2 micrometers, and still more preferably to within 0.5 micrometers. Once first write gap 18 and second write gaps 20 are aligned, first servo write head 14 and second servo write head 16 are mounted in a mounting structure 12.

Mounting structure 12 defines a width, W, and mounted servo write heads 14, 16 define a separation distance, d. The servo write heads 14, 16 may be mounted as close as possible to each other in mounting structure 12. A small separation distance simplifies the alignment of first write gap 18 and second write gaps 20. In addition, a large mounting structure width, with respect to the small d, reduces the affect any mounting structure tilt may have on write gap alignment. In other words, mounting structure 12 may be positioned at a slight tilt within servo writing apparatus 10, but the tilt may not cause substantial misalignment of the first write gap 18 and the second write gaps 20. Therefore a large W to d ratio is desired, such as a ratio of 5 to 1. For example, in one embodiment a mounting structure has a width of approximately 37 millimeters and the servo write heads have a separation distance of approximately 6.6 millimeters, which equates to the desired ratio. In other embodiments, the servo write head separation distance, d, may be less than 20 mm, more preferably less than 10 mm, more preferably less than 5 mm, more preferably less than 1.5 mm, and still more preferably less than 0.7 mm. Accordingly, the mounting structure width, W, may be greater than 10 mm, more preferably greater than 20 mm, more preferably greater than 30 mm, more preferably greater than 40 mm, and still more preferably greater than 50 mm. Therefore, a ratio of W to d may be 2 to 1, more preferably 3 to 1, more preferably 5 to 1, more preferably 10 to 1, more preferably 20 to 1, and still more preferably 50 to 1.

First write gap 18 provides a continuous direct current (DC) magnetic field to fully magnetize (a.k.a. DC erase) the servo band corresponding to servo channel 22 of the magnetic data storage tape. In some embodiments, a permanent magnet supplies the continuous magnetic field to first write gap 18. However, a controllable electromagnet including a coiled wire about a magnetic core is preferred.

Second write gaps 20 define a time-based servo pattern in the servo band corresponding to servo channel 22. The servo pattern includes sets of time-based servo markings such as "/\," as shown in FIG. 1. Examples of other time-based servo markings include "\ /," "//// \\\\," "\\\\ ////," "< >," "<<'combinations of these servo markings, or other patterns which have shapes useful for time-based servo techniques. In order to define the time-based servo patterns, second servo write head 16 may comprise any number of write gaps. In any case, second write gaps 20 are controlled to provide magnetic field pulses to record the servo markings in the servo band.

A data band may lie directly above and/or directly below the servo band corresponding to servo channel 22 defined by first write gap 18 and second write gaps 20. In most embodiments, a plurality of data tracks may be defined in the data band corresponding to servo channel 22. The time-based servo pattern recorded in the servo band is used to generate a position error signal. Based on the position error signal, the lateral distance of a data head relative to a data band of the magnetic data storage tape may be adjusted so that the data head is accurately positioned along the data band for effective reading and/or writing of the data to the data band. Accurate data head alignment allows the magnetic data storage tape to include additional data bands without sacrificing the integrity of stored signals. However, in cases of poor servo head alignment, a region of the servo band may have zero magnetization and therefore cause half amplitude servo signals near edges of the servo band. In addition, poor alignment may cause a region of the data band to be magnetized and therefore cause peak shift of the data signal.

Conventional servo writing apparatuses include one servo write head with one or more write gaps to record a time-based servo pattern in a servo band defined by the servo write head. The write gaps record the servo pattern using transitions on the servo band of a randomly magnetized medium surface. The randomly magnetized medium surface may cause nonuniform servo signal amplitude. Therefore, the strength of the servo signal is limited.

Servo writing apparatus 10 increases the strength of the recorded servo signal by first magnetizing the magnetic particles in the servo band in a first direction. The servo markings are then recorded in the servo band with magnetization in a second direction, which is substantially opposite the first direction. In this way, the servo signal strength is substantially doubled relative to conventional servo writing techniques that write signals to a randomly magnetized medium surface. Furthermore, the fully magnetized servo band provides for substantially uniform servo signal amplitude. Accordingly, more accurate position error signals may be determined from the uniform servo signal, which improves alignment accuracy of the data head to the data band of the magnetic data storage tape.

Figure 2:
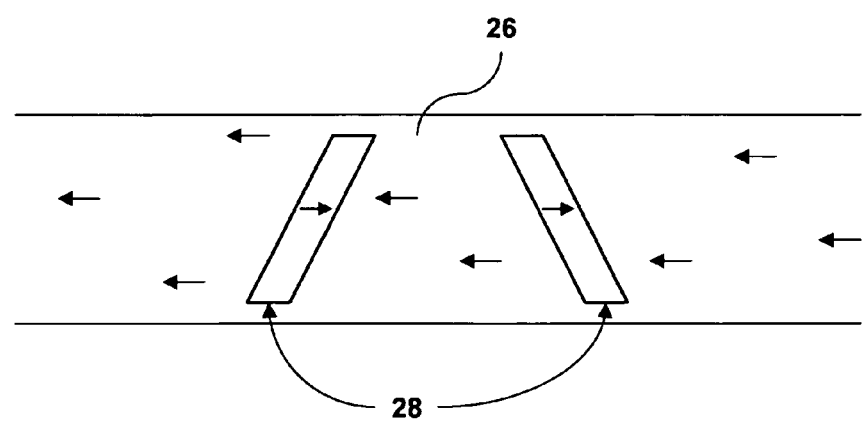
FIG. 2 is a schematic diagram illustrating an example servo band on a magnetic data storage tape defined by the servo writing apparatus from FIG. 1.

FIG. 2 is a schematic diagram illustrating an example servo band 26 of a magnetic data storage tape defined by servo writing apparatus 10 from FIG. 1. Servo band 26 corresponds to a servo channel, such as servo channel 22 from FIG. 1, which is defined by first write gap 18 and second write gaps 20. Servo band 26 is fully magnetized (a.k.a. DC erased) in a first direction, as illustrated by the arrows pointing left. Servo pattern 28 is recorded in fully magnetized servo band 26 with a magnetic moment oriented in a second direction that is substantially opposite the first direction, as illustrated by the arrows pointing right. In other embodiments, the servo pattern may include different shapes and/or quantities of servo markings. Examples of other servo patterns include an N-shaped pattern, a "\ /"-shaped pattern, a "< >"-shaped pattern, a "//// \\\\"-shaped pattern, a "\\\\ ////"-shaped pattern, and a "<<<< >>>>"-shaped pattern, combinations of these patterns, or other patterns which have shapes useful for time-based servo techniques.

Fully magnetizing, or DC erasing, the servo band prior to recording the servo pattern doubles the servo signal amplitude relative to a servo write pass on randomly magnetized magnetic tape. Increasing servo signal amplitude is very important as the data track widths, servo read gap widths, and magnetic coating thickness of tapes are reduced, because the servo signal strength is also dependant on the data track width, servo read gap width, and magnetic coating thickness. As the servo signal is reduced, a system signal to noise ratio (SNR) is also reduced, and the noise in a position error signal of the servo system is increased, making it more likely that a data track will be written in an incorrect location on the tape. Therefore, at small band widths, it becomes more important to enhance the servo signal amplitude to ensure accurate data readout.

Properly aligning the first write gap 18 and second write gaps 20 ensures servo markings 28 are recorded within fully magnetized servo band 26. Furthermore, aligning first write gap 18 and second write gap 20 to a mount reference surface (not shown) in mounting structure 12 prevents first servo write head 14 and second servo write head 16 from recording servo signals in neighboring data bands, which is undesirable.

Figure 3:
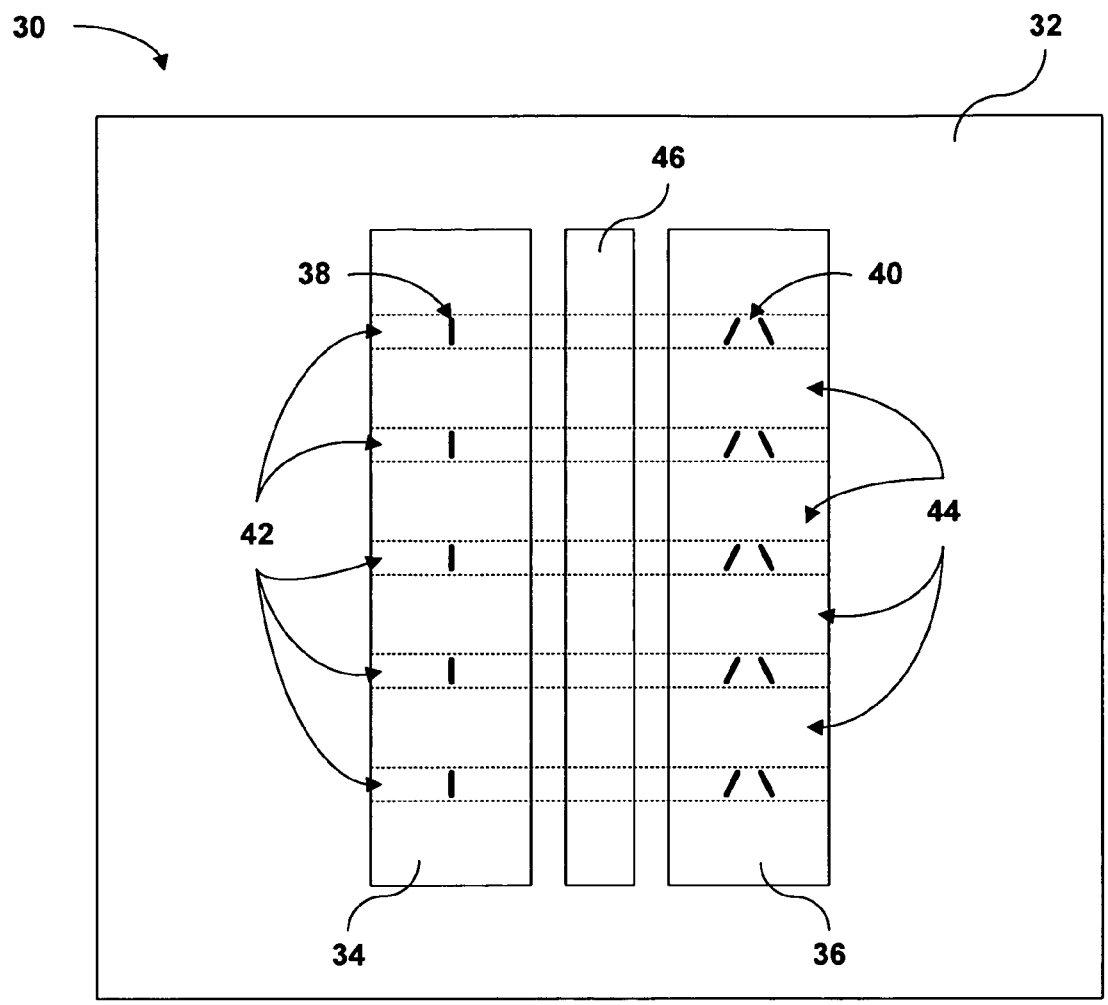
FIG. 3 is a schematic diagram illustrating an example servo writing apparatus to write servo patterns to five servo bands of a magnetic data storage tape substantially simultaneously.

FIG. 3 is a schematic diagram illustrating an example servo writing apparatus 30 to write servo patterns in five servo bands of a magnetic data storage tape substantially simultaneously. In other words, servo writing apparatus 30 defines five servo channels. Servo writing apparatus 30 includes a first servo write head 34 and a second servo write head 36. First servo write head 34 comprises five first write gaps 38 to substantially magnetize magnetic particles in the five servo bands of the magnetic data storage tape in a first direction. Second servo write head 36 comprises five second write gaps 40 oriented to define time-based servo patterns magnetized in a second direction in the five servo bands of the magnetic tape. In other embodiments, first servo write head 34 may include more or fewer first write gaps 38 and second servo write head 36 may include more or fewer second write gaps 40. In other words, any number of channels may be defined in different embodiments. Servo writing apparatus 30 may also include a shield 46 between first servo write head 34 and second servo write head 36. Shield 46 may comprise a conductive material, alternating layers of conductive and magnetically permeable materials, or any material or set of materials that can reduce cross-talk between the servo write heads.

The five first write gaps 38 align with the corresponding five second write gaps 40 to define five servo channels 42. Each of the five servo channels 42 corresponds to one of the five servo bands of the magnetic data storage tape. A plurality of servo tracks may be defined in the servo bands corresponding to the five servo channels 42. Each of the five first write gaps 38 and the corresponding five second write gaps 40 are aligned in one of the five servo channels 42 to within 10 micrometers, more preferably to within 5 micrometers, more preferably to within 2 micrometers, and still more preferably to within 0.5 micrometer. Once the five first write gaps 38 and the five second write gaps 40 are aligned, first servo write head 34 and second servo write head 36 are mounted in a mounting structure 32. Microscopes or other optical alignment techniques can be used to ensure proper alignment. Photolithographic or ion beam techniques may also be used to ensure proper alignment.

The aligned five first write gaps 38 and five second write gaps 40 allow the five servo bands to be uniformly fully magnetized, or DC erased, and written with servo patterns without affecting neighboring data bands. Regions 44 corresponding to data bands of the magnetic data storage tape are placed between each of the five defined channels 42. At least one data track may be defined in the data bands corresponding to regions 44. Therefore, each of the five servo channels 42 is separated by a distance corresponding to a width of a data band, wherein the data band is less than approximately 2660 micrometers wide and the data tracks are approximately 18 micrometers wide, and the servo band is approximately 190 micrometers wide. In some embodiments, the data band, data track, and servo band widths may be reduced, for example, the data band width may be between 665 and 1330 micrometers, the data track widths may be between 3 and 14 micrometers, and the servo band width may be between 48 and 95 micrometers. In addition, bands including widths of approximately 5 micrometers wide or less separate the servo bands and data bands. In that way, servo writing apparatus 30 may record servo signals to the five servo bands of the magnetic data storage tape in a single write pass and leave ample room for the adjacent data bands to be recorded without the data and servo signals significantly overlapping.

Figure 4:
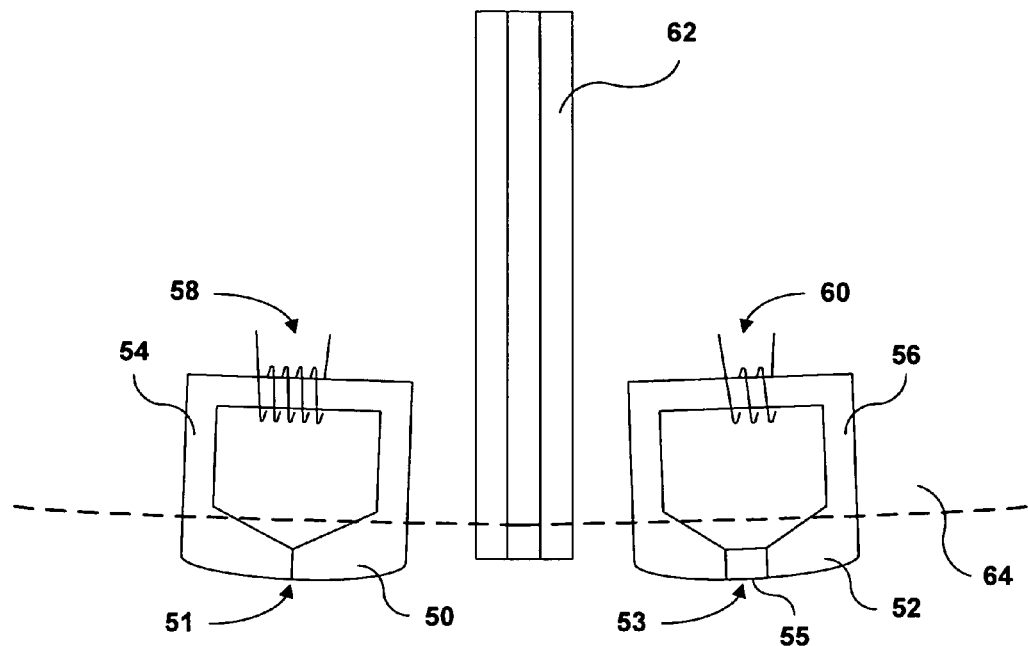
FIG. 4 is a schematic diagram illustrating an example configuration of a first servo write head and a second servo write head in a servo writing apparatus.

FIG. 4 is a schematic diagram illustrating an example configuration of a first servo write head 50 and a second servo write head 52 in a servo writing apparatus similar to servo writing apparatuses 10 and 30 described above. First servo write head 50 comprises a first write gap 51, a first core 54, and a first coil 58. Second servo write head 52 comprises second write gaps 53, a surface thin film 55, a second core 56, and a second coil 60. First servo write head 50 and second servo write head 52 are mounted separately in a mounting structure 64. A shield 62 may be mounted in mounting structure 64 between the first and second servo write heads in order to reduce cross-talk. Shield 62 may comprise alternating layers of a magnetically permeable material and a conductive material. First and second servo write heads 50 and 52 may also include non-magnetic spacers to separate cores and gaps.

In the servo write head configuration shown in FIG. 4, first write gap 51 and second write gaps 53 define a servo channel corresponding to a servo band in a magnetic data storage tape. First write gap 51 (not visible in FIG. 4) may operate substantially similar to first write gap 18 described in reference to FIG. 1. Second write gaps 53 (not visible in FIG. 4) may operate substantially similar to second write gaps 20 described in reference to FIG. 1. First write gap 51 fully magnetizes the servo band in a first direction and second write gaps 53 record a servo pattern in the servo band with magnetic moments oriented in a second direction substantially opposite the first direction. First coil 58 is controlled to provide a direct current (DC) to first core 54 to generate a DC magnetic field across first write gap 51. Second coil 60 is controlled to provide current pulses to second core 56 to generate magnetic field pulses across second write gaps 53. First core 54 may be formed from ferrite, permanent magnets, thin film, or metal. Second core 56 may be formed substantially similar to first core 54. In addition, second core 56 may be formed from ferrite covered with surface thin film 55 including second write gaps 53, as illustrated herein, or a planar thin film core with second write gaps 53.

In order to maintain uniform servo amplitude throughout the servo band and generate a strong position error signal, first write gap 51 and second write gaps 53 must be substantially aligned with each other and within mounting structure 64. In some embodiments, first and second servo write heads 50, 52 have a small separation distance with respect to a width of the mounting structure 64. The small separation distance allows first write gap 51 and second write gaps 53 to be easily aligned and reduces any antialignment affects from a tilted placement of mounting structure 64 in the servo writing apparatus.

Second servo write head 52 is mounted in mounting structure 64 after second write gaps 53 are aligned with a mount reference surface (not shown) of mounting structure 64. First servo write head 50 is mounted in mounting structure 64 after first write gap 51 is aligned with second write gaps 53. In that way, first write gap 51 and second write gaps 53 substantially align in the servo channel corresponding to the servo band to create an accurate position error signal and a uniform servo cross band amplitude, both of which improve the alignment of a data head to a data band of the magnetic data storage tape. In the case described herein, second write gaps 53 are aligned with the mount reference surface first to ensure the servo pattern is aligned to the servo band. In other embodiments, the first write gap 51 may be aligned to the mount reference surface before the second write gaps 53.

Figure 5:
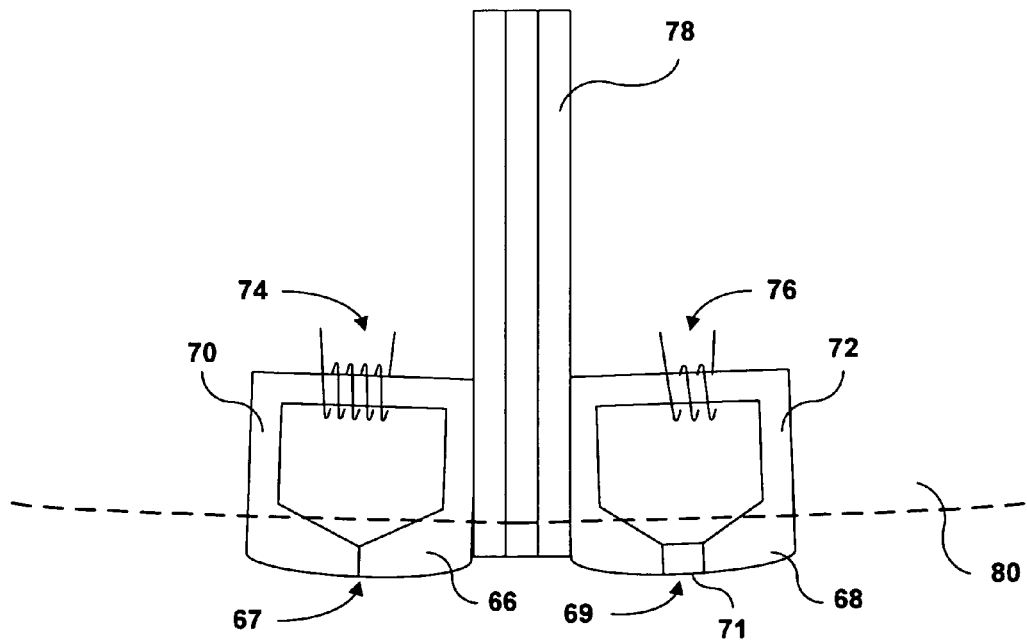
FIG. 5 is a schematic diagram illustrating another example configuration of a first servo write head and a second servo write head in a servo writing apparatus.

FIG. 5 is a schematic diagram illustrating an example configuration of a first servo write head 66 and a second servo write head 68 in a servo writing apparatus similar to servo writing apparatuses 10 and 30 described above. First servo write head 66 comprises a first write gap 67, a first core 70, and a first coil 74. Second servo write head 68 comprises second write gaps 69, a surface thin film 71, a second core 72, and a second coil 76. First servo write head 66 and second servo write head 68 are bonded to each other and then mounted in a mounting structure 80. A shield 78 may be bonded between the first and second servo write heads in order to reduce cross-talk. Shield 78 may comprise alternating layers of a magnetically permeable material and a conductive material. In some embodiments, a nonmagnetic and nonconductive spacer may be bonded between the write heads in place of the shield 78. Spacers may also be integrated into the write head structures to eliminate the need to bond a separate spacer between the servo write heads.

First write gap 67 and second write gaps 69 define a servo channel corresponding to a servo band of a magnetic data storage tape. First write gap 67 (not visible in FIG. 5) may operate substantially similar to first write gap 18 described in reference to FIG. 1. Second write gaps 69 (not visible in FIG. 5) may operate substantially similar to second write gaps 20 described in reference to FIG. 1. First servo write head 66 and second servo write head 68 record servo signals in the servo band in substantially the same way as other servo write head configurations described above. First core 70 and second core 72 are formed substantially similar to other servo write head cores described above. In particular, as illustrated herein, second core 72 may be formed from ferrite covered with surface thin film 71 including second write gaps 69.

First servo write head 66 is bonded to second servo write head 68 after first write gap 67 and second write gaps 69 are aligned with each other. The bonded servo write heads are aligned with a mount reference surface prior to being mounted in mounting structure 80. Bonding the servo write heads to each other reduces a servo write head separation distance. The small separation distance and a large mounting structure width ensure accurate alignment of the first write gap 67 and the second write gaps 69 in the servo channel corresponding to the servo band, which improves alignment of a data head to a data band of the magnetic data storage tape.

Figure 6:
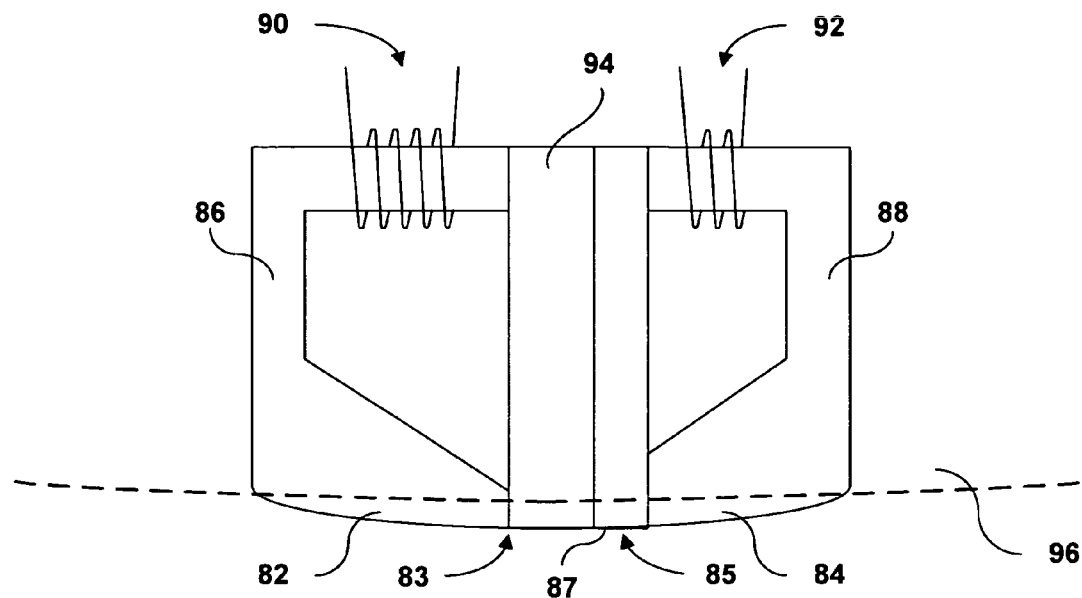
FIG. 6 is a schematic diagram illustrating a further example configuration of a first servo write head and a second servo write head in a servo writing apparatus.

FIG. 6 is a schematic diagram illustrating an example configuration of a first servo write head 82 and a second servo write head 84 in a servo writing apparatus similar to servo writing apparatuses 10 and 30 described above. First servo write head 82 includes a first write gap 83, a first core 86, and a first coil 90. Second servo write head 84 includes second write gaps 85, a surface thin film 87, a second core 88, and a second coil 92. First core 86 and second core 88 are aligned and bonded to each other via a third core 94. Third core 94 reduces the distance between first servo write gap 83 and second servo write gaps 85. The bonded cores are then mounted in a mounting structure 96. Third core 94 may be a one piece magnetic material, such as an I-core (as illustrated) or a C-core, to reduce spacing between first write gap 83 and second write gaps 85. Third core 94 may also comprise layers of magnetic material one either side of a spacer to reduce cross talk between the first and second servo write gaps. The spacer may improve core isolation, but increases the write head separation distance.

First, second, and third cores 86, 88, and 94 may comprise soft magnetic materials such as ferrite. The cores may also be metal, thin film, or a combination of metal, ferrite, and thin film. Conventionally, ferrite cores are preferred due to lower cost in small quantities, however thin film cores may also become cost effective as the complexity of servo patterns increase and the cost of thin film processes decrease. Wear resistant coatings such as iron nitride and DLC may be used on the surface of the films. Hard materials such as AlTiC may be used in regions of high contact pressure. The servo write gaps 83 and 85 may be vacant or filled with a substantially non-magnetic material.

First write gap 83 and second write gaps 85 define a servo channel corresponding to a servo band of a magnetic data storage tape. First write gap 83 (not visible in FIG. 6) may operate substantially similar to first write gap 18 described in reference to FIG. 1. Second write gaps 85 (not visible in FIG. 6) may operate substantially similar to second write gaps 20 described in reference to FIG. 1. First servo write head 82 and second servo write head 84 record servo signals on the magnetic data storage tape in substantially the same way as other servo write head configurations described above. First servo write gap 83 may include MIG layers to prevent pole tip saturation.

In the illustrated embodiment of FIG. 6, first write gap 83 comprises a conventional write gap not included in surface thin film 87. In that case, surface thin film 87 must be thin enough and far enough from first write gap 83 to allow first write gap 83 to contact the magnetic data storage tape. If surface thin film 87 is too thick or too close to first write gap 83, surface thin film 87 may lift first write gap 83 off the magnetic data storage tape and prevent first write gap 83 from writing signals to the magnetic tape. In other embodiments, surface thin film 87 may cover the entire surface of the servo writing apparatus, allowing both first write gap 83 and second write gaps 85 to be included in surface thin film 87.

First core 86 and third core 94 are bonded to each other. Second core 88 and third core 94 are bonded to each other and first write gap 83 and second write gaps 85 are aligned with each other. The bonded servo write heads 82, 84 are aligned with a mount reference surface prior to being mounted in mounting structure 96. Bonding the cores to each other reduces a servo write head separation distance. The small separation distance and a large mounting structure width ensure accurate alignment and strong position error signals. A small current may be passed through the second coil 92 in order to offset a flux produced by the adjacent first core 86.

Figure 7A:
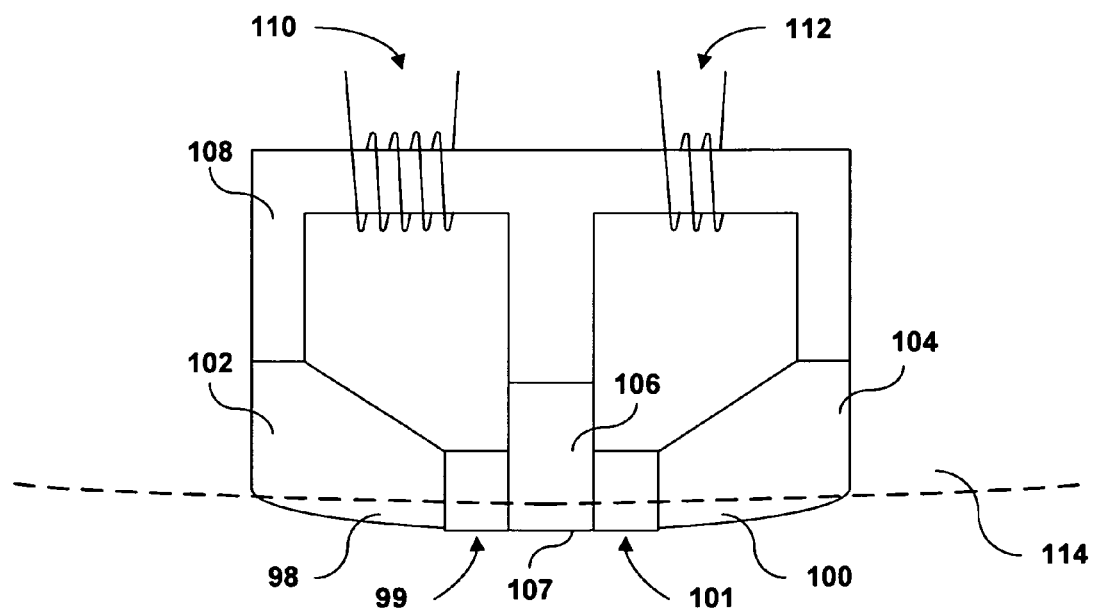
FIGS. 7A and 7B are schematic diagrams illustrating example configurations of a first servo write head and a second servo write head in a servo writing apparatus.

FIG. 7A is a schematic diagram illustrating an example configuration of a first servo write head 98 and a second servo write head 100 in a servo writing apparatus similar to servo writing apparatuses 10 and 30 described above. First servo write head 98 and second servo write head 100 are formed from a single core. The single core includes a first L-core 102 and a second L-core 104 bonded to each other via an I-core 106; the L-I-L core is then bonded to an E-core 108. First servo write head 98 comprises a first write gap 99 and a first coil 110 wrapped around a first portion of E-core 108. Second servo write head 100 comprises second write gaps 101 and a second coil 112 wrapped around a second portion of E-core 108. The single core is then mounted in a mounting structure 114. The servo writing apparatus comprises a surface thin film 107 and both first write gap 99 and second write gaps 101 are included in the surface thin film 107.

First write gap 99 and second write gaps 101 define a servo channel corresponding to a servo band of a magnetic data storage tape. First write gap 99 (not visible in FIG. 7A) may operate substantially similar to first write gap 18 described in reference to FIG. 1. Second write gaps 101 (not visible in FIG. 7A) may operate substantially similar to second write gaps 20 described in reference to FIG. 1. First servo write head 98 and second servo write head 100 record servo signals in the servo band in substantially the same way as other servo write head configurations described above.

First L-core 102 and second L-core 104 are bonded to each other after first being aligned with each other. The L-I-L core is then aligned and bonded to E-core 108. Aligning the first and second L-cores 102, 104 also aligns the first write gap 99 and the second write gaps 101 to each other. The single core is aligned with a mount reference surface prior to being mounted in mounting structure 114. Forming both first and second servo write heads 98 and 100 from the single core reduces a servo write head separation distance and ensures accurate write gap alignment. In other embodiments, the single core may be constructed in a variety of ways. For example, a bonded C-I-C core may be cut to form the L-I-L core, which bonds to the E-core.

Figure 7B:
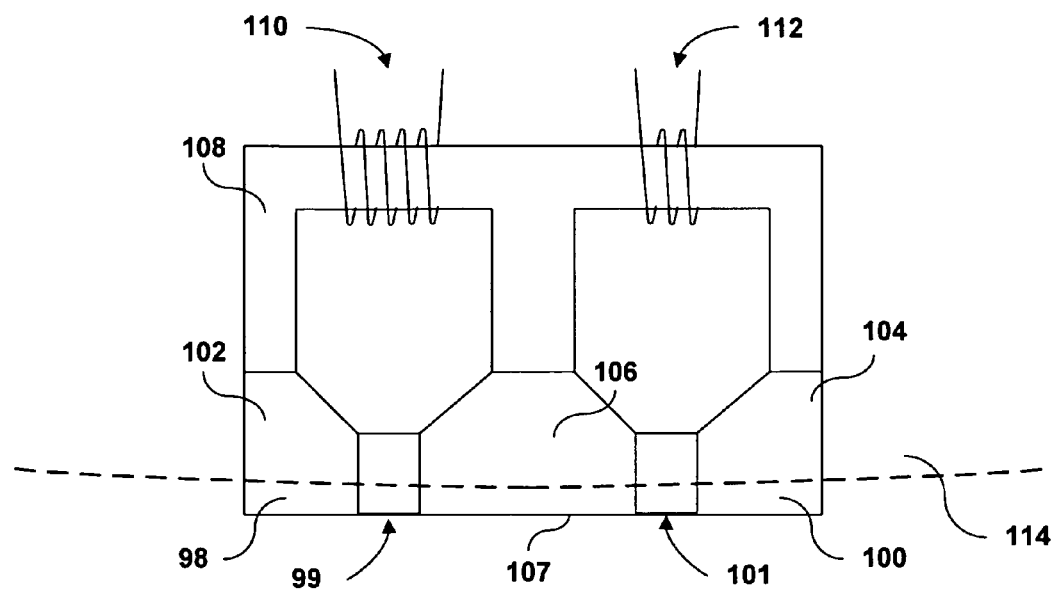
Figure 7C:
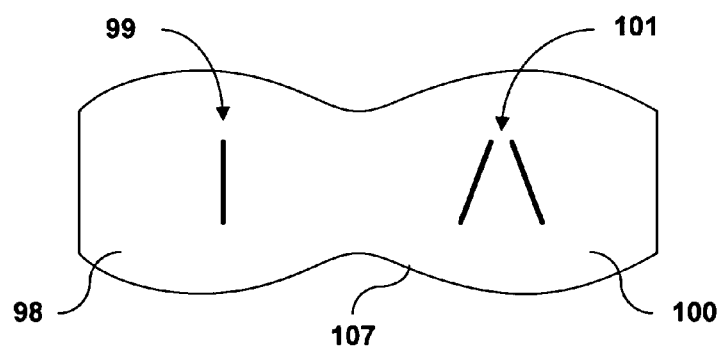
FIG. 7C is a top view of the servo write head illustrated in FIG. 7B.

FIG. 7B is a schematic diagram illustrating another example configuration of a first servo write head 98 and a second servo write head 100 in a servo writing apparatus similar to servo writing apparatuses 10 and 30 described above. FIG. 7C is a top view of the head illustrated in FIG. 7B. In the embodiment illustrated herein, the servo writing apparatus comprises a flat contour. In addition, a top view of the servo writing apparatus illustrates the embodiment of first servo write head 98 and second servo write head 100 combined in a single structure, as described in FIGS. 6, 7A, and 7B.

The servo writing apparatus embodiments are described above as including radius contours, however, as shown in FIG. 7B, a variety of contours may be applied to the invention. For example, a slotted radius, a flat contour, a flat contour with a radius, and a flat contour with a chamfer may also be used. In some embodiments it is preferable to have a substantially flat surface near servo write gaps formed in surface thin film 107 to ensure the write gaps are accurately formed. A flat surface also allows control of the alignment of first write gap 99 and second write gaps 101 by an accurate photolithographic process rather than a subsequent optical alignment process.

Cores 102, 104, 106, and 108 described in reference to FIGS. 7A and B may comprise soft magnetic materials such as ferrite. The cores may also be metal, thin film, or a combination of metal, ferrite, and thin film. Conventionally, ferrite cores with surface thin films are preferred due to lower cost in small quantities and good wear resistance, however thin film cores may also become cost effective as the complexity of servo patterns increase and the cost of thin film processes decrease. Wear resistant coatings such as iron nitride and DLC may be used on the surface of the films. Hard materials such as AlTiC may be used in regions of high contact pressure.

A radius contoured servo writing apparatus, shown in FIG. 7A, requires two photo steps to create and align first and second write gaps 99 and 101, and mounting structure 114 must be moved. Mounting structure 114 must first align to first write gap 99 and photoresist applied to the write gap is exposed to light, or other radiation. Then mounting structure 114 must be rotated to align the second write gaps 101 and photoresist applied to the write gaps is exposed to light. A mask may also be moved, or a different mask may be used for each servo write head 98, 100.

A substantially flat head, shown in FIG. 7B, requires only one photo step to create and align first and second write gaps 99 and 101. The photoresist for all gaps is exposed at one time, eliminating tolerance stack up. A gap tolerance is close to that of the mask and does not include errors introduced when a radius contour is used. The flat head eliminates errors that may occur due to repositioning the mounting structure and using a second mask.

The embodiment shown in FIGS. 6, 7A, and 7B may require a driver process different from the servo writing apparatuses described in FIGS. 4 and 5. Due to flux generated by coils 110 and 112, which share a common core element, additional current may be passed through either first coil 110 or second coil 112 in order to offset the flux created in the core by the other coil. In other words, the different gaps of the head may require tuning relative to one another to account for cross-talk between the different cores. For example, the current provided to first coil 110 may cause a magnetic field across second write gaps 101. Therefore a fraction of the current provided to first coil 110 may be subtracted from the current provided to second coil 112 to account for and cancel out the unwanted field across second write gaps 101. A fraction of the current provided to second coil 112 may be subtracted from the current provided to coil 110 to cancel out the unwanted field across first write gap 99. In short, the currents provided to coils 110 and 112 can be tuned relative to one another to achieve the desired fields across first write gap 99 and second write gaps 101.

The servo write heads illustrated in FIGS. 4, 5, 6, 7A, and 7B, may be included in a servo writing apparatus comprising a plurality of servo write heads corresponding to a plurality of servo bands on a magnetic data storage tape, substantially similar to FIG. 3. The servo writing apparatus may comprise a full width of the magnetic data storage tape and simultaneously write to the plurality of servo bands. If each of the first servo write heads comprises a ferrite core without a surface thin film, a nonmagnetic material may be located between the first servo write heads in order to only magnetize the corresponding servo bands. As an alternative, each of the servo write heads may include a surface thin film and nonmagnetic material located between the servo write heads. The nonmagnetic material may provide isolation for the servo write heads and make the servo write heads magnetically independent and more efficient. The plurality of first servo write heads may include a single coil through all of the first cores or may include a separate coil for each of the first cores. The plurality of second servo write heads may include a single coil through all of the second cores or may include a separate coil for each of the second cores.

Figure 8:
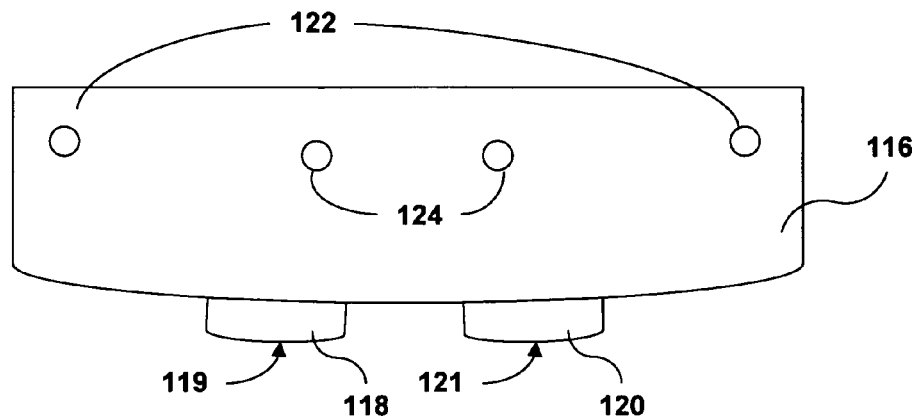
FIG. 8 is a schematic diagram illustrating a mounting structure for mounting servo write heads.

FIG. 8 is a schematic diagram illustrating a mounting structure 116 for mounting servo write heads. A first servo write head 118 and a second servo write head 120 are mounted in mounting structure 116, substantially similar to the servo writing apparatus described in reference to FIG. 4. First servo write head 118 comprises a first write gap 119 and second servo write head 120 comprises second write gaps 121. Mounting structure 116 also includes alignment holes 122 and may include clearance holes 124 for use with an alignment tool to align first write gap 119 and second write gaps 121 before mounting the servo write heads in mounting structure 116. In some embodiments, up to four clearance holes may be included in the mounting structure.

Figure 9:
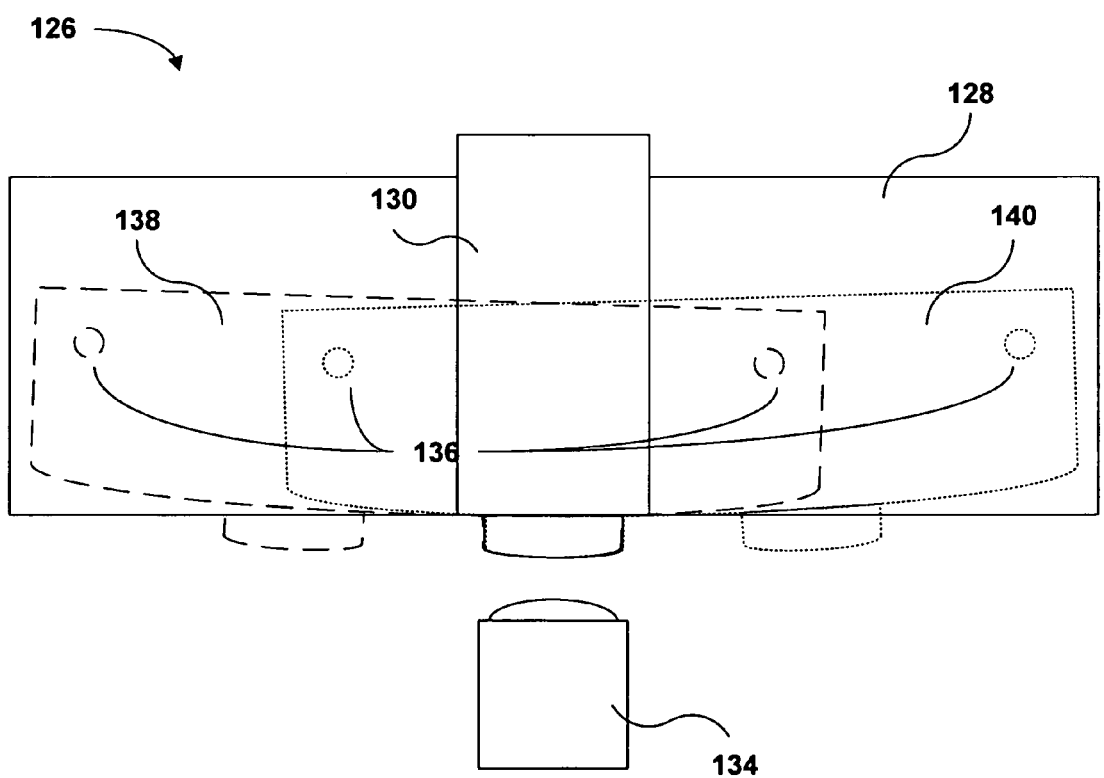
FIG. 9 is a schematic diagram illustrating an example alignment tool to align a first servo write head and a second servo write head within a mounting structure.

FIG. 9 is a schematic diagram illustrating an example alignment tool 126 to align first write gap 119 and second write gaps 121 within mounting structure 116. Alignment tool 126 includes a mount holder 128, a servo head holder 130, a microscope objective 134, and reference pins 136. Alignment tool 126 positions mounting structure 116 such that one of first servo write head 118 and second servo write head 120 are placed into servo head holder 130 relative to microscope objective 134. Microscope objective 134 determines the positions of the servo write heads needed to align the write gaps within mounting structure 116 and to each other. Servo head holder positions the servo write heads by translating in at least one direction and rotating about at least one axis to modify the height and azimuth of the servo write heads. In some embodiments, the servo head holder 130 may translate the servo write heads about up to six axes.

Mount holder 128 holds mounting structure 116 in a first position 138. First position 138 places second servo write head 120 into servo head holder 130. Second write gaps 121 are aligned within mounting structure 116 by servo head holder 130 and microscope objective 134. Second servo write head 120 is then tacked into the determined position in mounting structure 116. Mounting structure 116 may then be repositioned such that mount holder 128 holds mounting structure 116 in a second position 140. Second position 140 allows first servo write head 118 to be placed into servo head holder 130. First write gap 119 is also aligned within mounting structure 116, and therefore to second write gaps 121, by servo head holder 130 and microscope objective 134. The first servo write head 118 is then tacked into the determined position in mounting structure 116. The clearance holes 124 in mounting structure 116 allow mounting structure 116 to be placed in both first and second positions 138 and 140 relative to reference pins 136.

The alignment tool shown in FIG. 9 is only one type of alignment tool that may be used to align first write gap 119 and second write gaps 121 in mounting structure 116. In other embodiments, a variety of other alignment tools and/or methods may be used. For example, mount holder 128 may include only two pins such that mount holder 128 holds mounting structure 116 in one position. In that case, either mount holder 128 or microscope objective 134 may be on a movable stage to reorient mounting structure 116 to the microscope objective 134. The movable stage may be more accurate than relocating mounting structure 116 on reference pins 136, as illustrated herein. The movable stage may include a center of rotation located at approximately an intersection of a plane perpendicular to the contour surface at first write gap 119 of first servo write head 118 and second write gaps 121 of second servo write head 120.

In addition to optical alignment, magnetic alignment may be used. A read head may be passed proximate a magnetic tape to read the servo pattern recorded by first servo write head 118 and second servo write head 120. Second write gaps 121 may be aligned within mounting structure 116. The read head reads the amplitudes generated by the first and second write gaps to determine a position of first write head 118 that yields the greatest amplitude across the magnetic tape. The position of first write head 118 is adjusted based on the output of the read head in order to align first write gap 119 to second write gaps 121.

Figure 10:
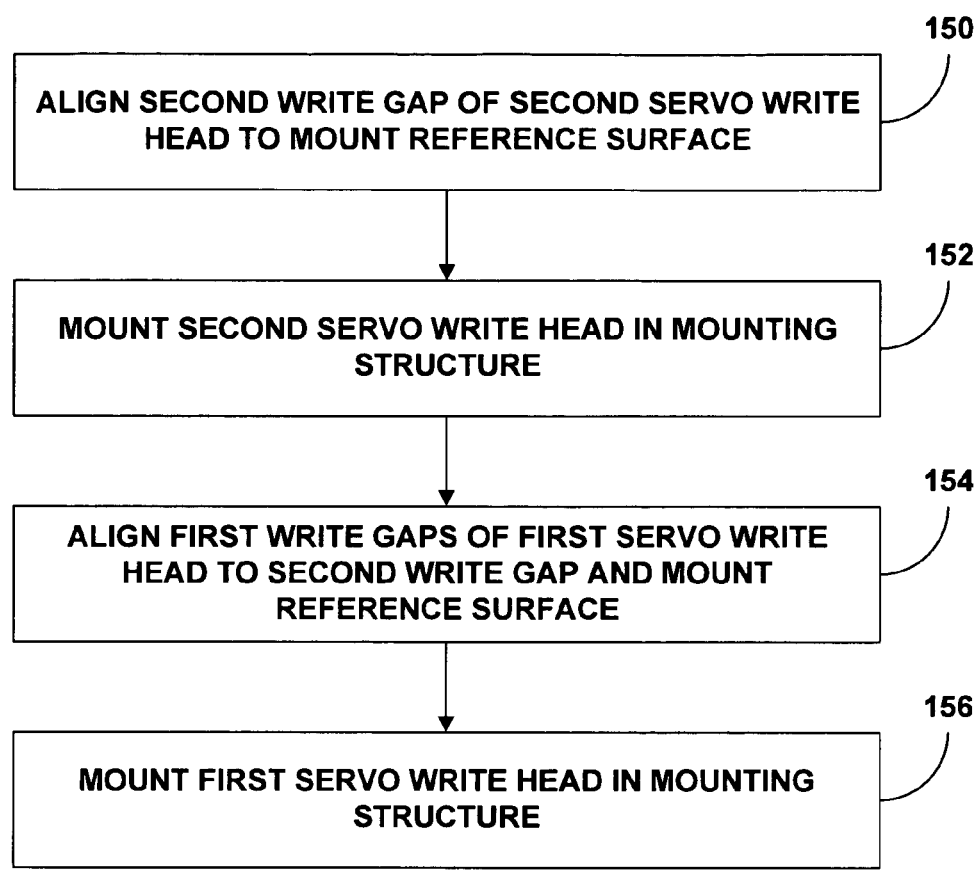
FIG. 10 is a flowchart illustrating a method of creating a servo writing apparatus with separately mounted servo write heads.

FIG. 10 is a flowchart illustrating a method of creating a servo writing apparatus with separately mounted servo write heads. Second write gap 53 of a second servo write head 52 is aligned to a mount reference surface (150) of a mounting structure 64. The second servo write head 52 is mounted in mounting structure 64 (152). A first write gap 51 of a first servo write head 50 is aligned to the second write gaps 53 and the mount reference surface (154) of the mounting structure 64. The first servo write head 50 is then mounted in mounting structure 64. The first write gap 51 and the second write gaps 53 may be aligned to each other and the mount reference surface by an alignment tool such as alignment tool 126 described in reference to FIG. 9.

First servo write head 50 and second servo write head 52 are mounted a small distance apart relative to a width of mounting structure 64. In one embodiment, the separation distance is approximately 6.6 mm and the mounting structure width is approximately 37 mm, which is a ratio of approximately 5 to 1. A smaller servo write head separation distance makes transferring the alignment from the alignment tool to the servo writing apparatus easier. A larger mounting structure width reduces anti-alignment effects that a tilted positioning of the mounting structure may have on the write gaps.

Figure 11:
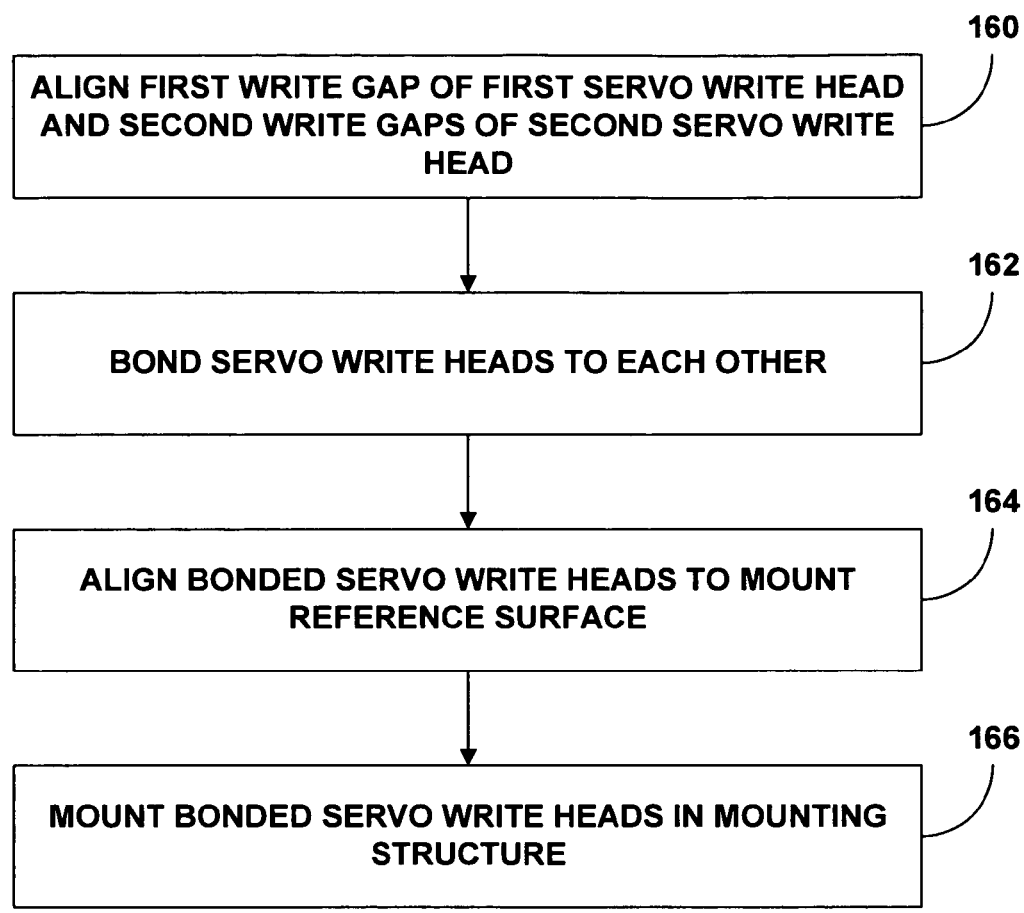
FIG. 11 is a flowchart illustrating a method of creating a servo writing apparatus with bonded servo write heads.

FIG. 11 is a flowchart illustrating a method of creating a servo writing apparatus with bonded servo write heads. A first write gap 67 of a first servo write head 66 and second write gaps 69 of a second servo write head 68 are aligned (160). The servo write heads 66, 68 with the aligned write gaps are bonded to each other (162). The bonded servo write heads 66, 68 are aligned to a mount reference surface (164) of a mounting structure 80. The bonded servo write heads are mounted in mounting structure 80 (166).

Bonded first and second servo write heads 66 and 68 typically comprise a smaller separation distance than the mounted servo write heads 50 and 52. Therefore, the bonded write heads may comprise a more accurate alignment along the servo band and provide a stronger position error signal for better data head to data band alignment.

Figure 12:
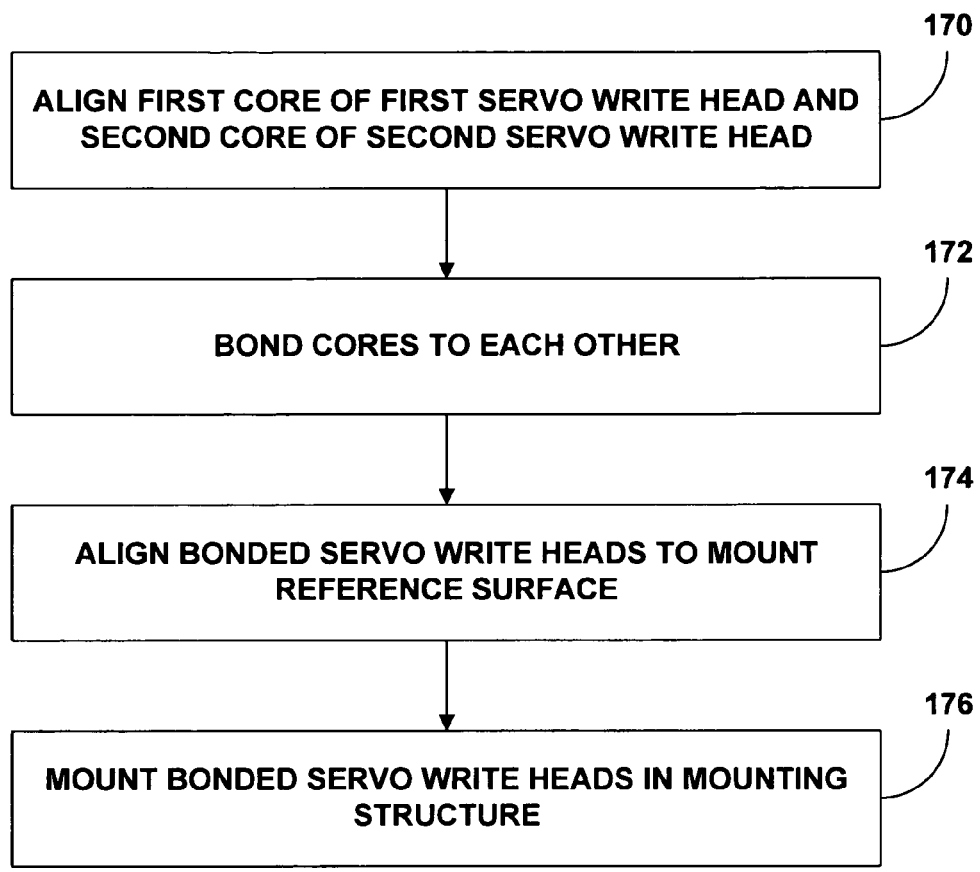
FIG. 12 is a flowchart illustrating a method of creating a servo writing apparatus with bonded servo write head cores.

FIG. 12 is a flowchart illustrating a method of creating a servo writing apparatus with bonded servo write head cores. A first core 86 of a first servo write head 82 and a second core 88 of a second servo write head 84 are aligned (170). The aligned cores 86, 88 are bonded to each other (172) to join the first and second servo write heads 82 and 84. A surface thin film 87 is applied to the bonded cores. Second write gaps 85 are formed in the surface thin film 87. In some embodiments, first write gap 83 may also be formed in surface thin film 87. The bonded servo write heads 82, 84 are aligned to a mount reference surface (174) of a mounting structure 96. The bonded servo write heads are mounted in mounting structure 96 (176).

In some cases, the first and second cores 86 and 88 may be modified such that a separation distance between first write gap 83 and second write gaps 85 is reduced. The separation distance may be further reduced by eliminating a spacer bonded between the first and second cores to provide isolation. In that case, the separation distance may be smaller than that of the bonded servo write heads 66 and 68. However, the proximity of the first core 86 to the second core 88 may cause unwanted flux from the DC signal to interact with the pulse signal of second core 86. Therefore, a small additional flux may be passed through second core 88 to offset the flux from first core 86.

Figure 13:
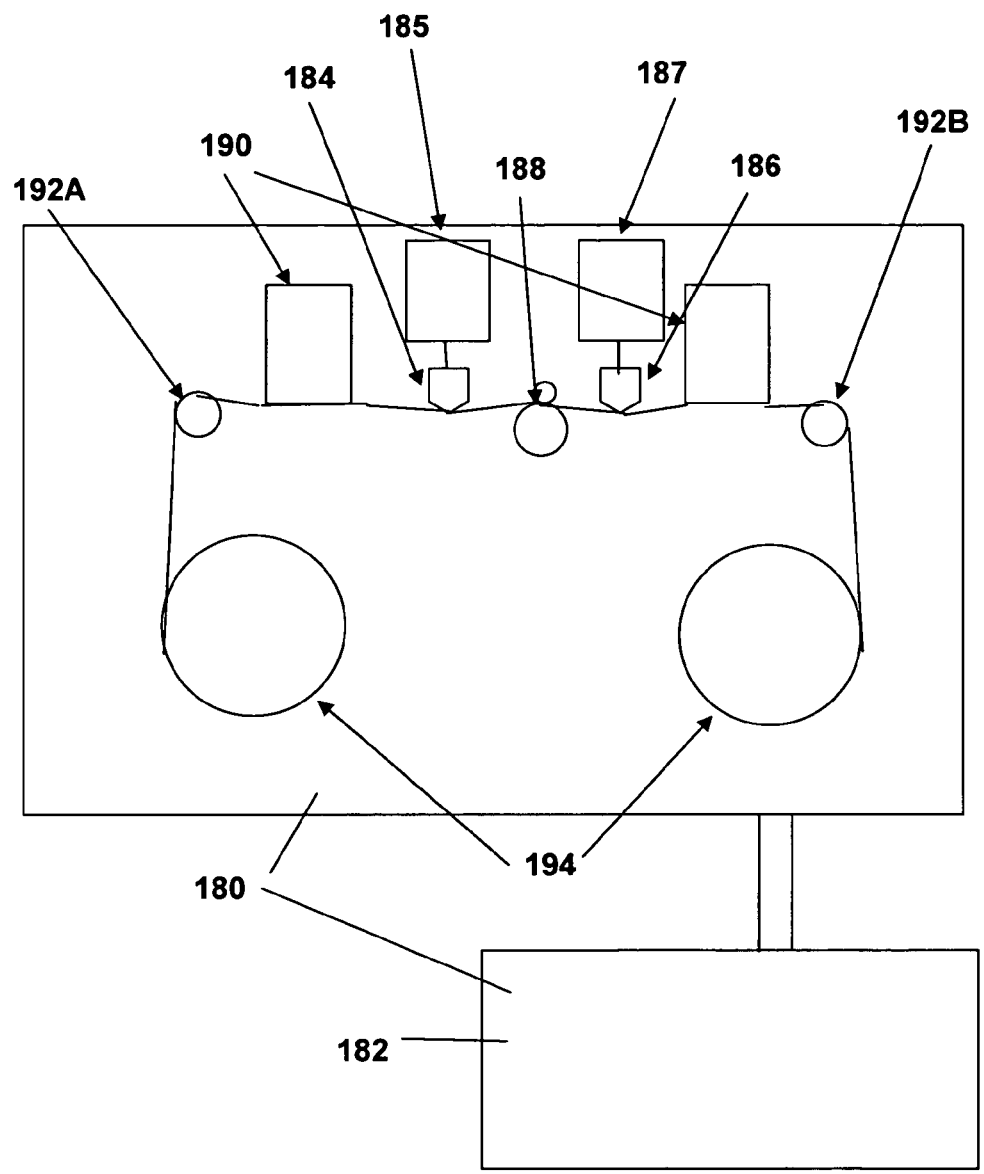
FIG. 13 is a schematic diagram illustrating a servo writing system including a single structure for a first and second write heads.

FIG. 13 is a schematic diagram illustrating a servo writing system 180 including a single structure 184 for first and second write heads. System 180 includes a controller 182, a write head structure 184, a write amplifier 185, a read head 186, a read amplifier 187, a capstan 188, vacuum columns 190, guides 192A and 192B (hereinafter "guides 192"), and reels 194. Guides 192 guide a magnetic tape from reels 194 and hold the magnetic tape proximate write head structure 184 and read head 186. Write head structure 184 comprises first and second write heads substantially similar to FIGS. 6, 7A, and 7B. Write amplifier 185 provides a current to write head structure 184 to record a servo pattern, as described above, on the magnetic tape. In the illustrated embodiment, the servo writing system 180 requires less time to change the first and second write heads included in write head structure 184 because little or no alignment is required.

Figure 14:
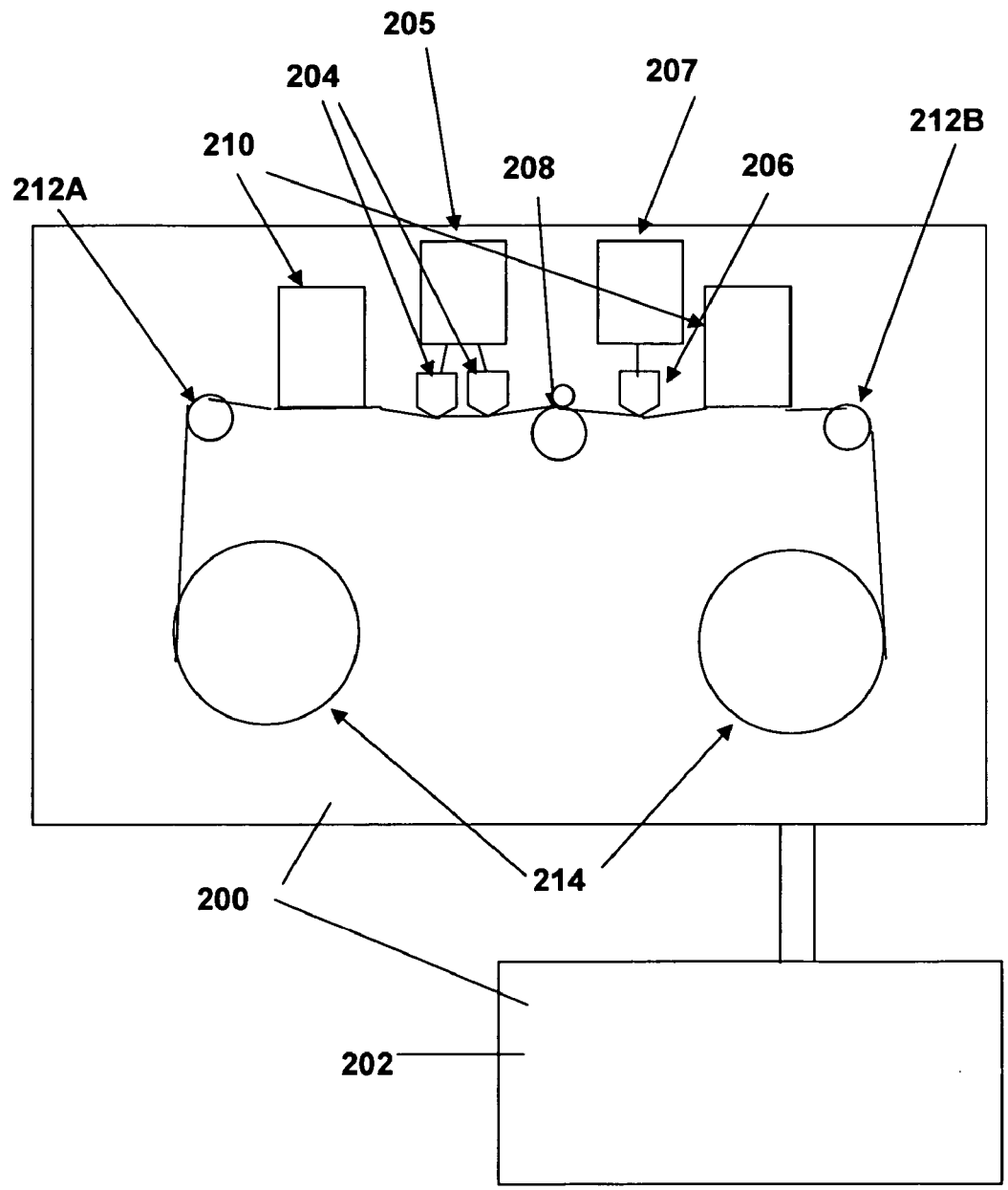
FIG. 14 is a schematic diagram illustrating a servo writing system including separate first and second write heads.

FIG. 14 is a schematic diagram illustrating a servo writing system 200 including separate first and second write heads 204. System 200 includes a controller 202, first and second write heads 204, a write amplifier 205, a read head 206, a read amplifier 207, a capstan 208, vacuum columns 210, guides 212A and 212B (hereinafter "guides 212"), and reels 214. Guides 212 guide a magnetic tape from reels 214 and hold the magnetic tape proximate first and second write heads 204 and read head 206. First and second write heads 204 are arranged substantially similar to FIGS. 4 and 5. Write amplifier 205 provides a current to first and second write heads 204 to record a servo pattern on the magnetic tape. In the illustrated embodiment, the servo writing system 200 requires alignment when first and second write heads 204 are changed. The servo writing system may include a means of adjusting the position of the first and second write heads 204 in order to align servo write gaps included in first and second write heads 204 with servo bands on the magnetic tape.

Figure 15:
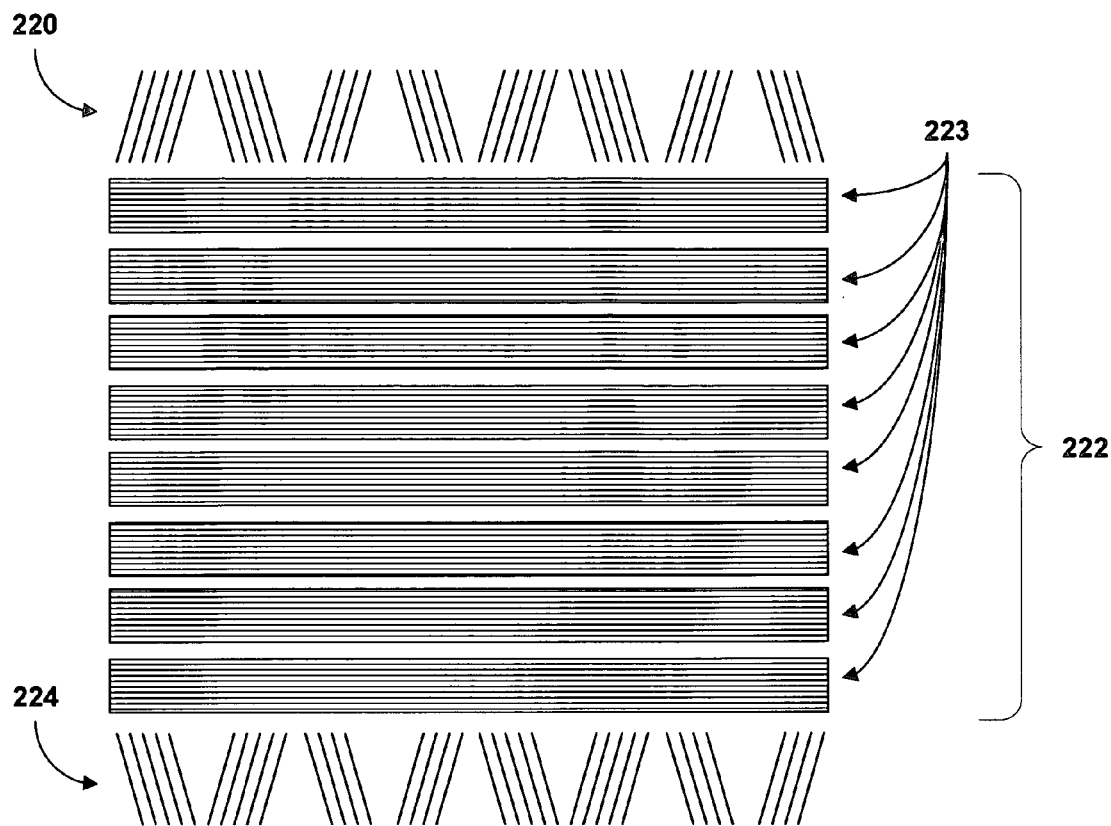
FIG. 15 is a schematic diagram illustrating a magnetic tape written with a servo writing apparatus.

FIG. 15 is a schematic diagram illustrating a magnetic tape written with a servo writing apparatus described above. The magnetic tape includes a first servo band 220, a data band 222 including eight data sub-bands 223, and a second servo band 224. First servo band 220 and second servo band 224 correspond to a first channel and a second channel defined by write gaps in the servo writing apparatus. Each of the servo bands and the sub-data bands define a plurality of servo tracks and data tracks, respectively. In other embodiments, any number of data bands and sub-data bands may be positioned between first servo band 220 and second servo band 224.

Figure 16:
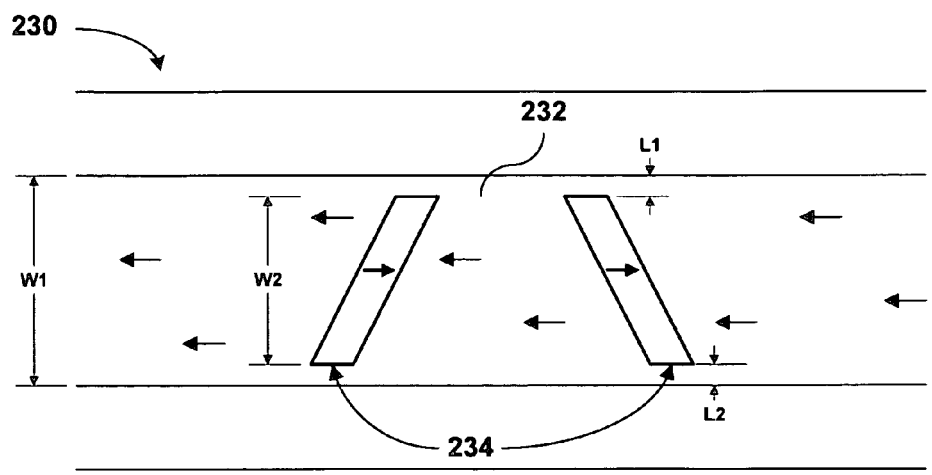
FIG. 16 is a schematic diagram illustrating an example magnetic data storage tape written with a servo writing apparatus.

FIG. 16 is a schematic diagram illustrating an example magnetic data storage tape 230 written with a servo writing apparatus as described above. Magnetic tape 230 includes a servo band 232 that corresponds to a servo channel, which is defined by a first write gap and second write gaps of the servo writing apparatus. Servo band 232 is fully magnetized (a.k.a. DC erased) in a first direction, as illustrated by the arrows pointing left. A servo pattern 234 is recorded in fully magnetized servo band 232 with a magnetic moment oriented in a second direction that is substantially opposite the first direction, as illustrated by the arrows pointing right. In other embodiments, the servo pattern may include different shapes and/or quantities of servo markings. Examples of other servo patterns include an N-shaped pattern, a "\ /"-shaped pattern, a "< >"-shaped pattern, a "//// \\\\"-shaped pattern, a "\\\\ ////"-shaped pattern, and a "<<<< >>>>"-shaped pattern, combinations of these patterns, or other patterns which have shapes useful for time-based servo techniques.

Properly aligning the first write gap and the second write gaps that correspond to servo track 232 ensures servo markings 234 are recorded within fully magnetized servo band 232. Servo band 232 defines a width W1 less than 190 micrometers, preferably less than 95 micrometers, and still more preferably less than 48 micrometers. Servo pattern 234 defines a width W2 aligned in the servo band 232 to within 10 micrometers, more preferably to within 5 micrometers, more preferably to within 2 micrometers, and still more preferably to within 0.5 micrometer. For example, if W1 and W2 comprise the same widths, the servo pattern 234 will align at edges of the servo band 232 and substantially exactly overlap servo band 232. In the illustrated embodiment, W2 comprises a width less than W1. In that case, the servo pattern 234 aligns in the servo band 232 such that lengths L1 and L2 between edges of the servo pattern 234 and edges of the servo band 232 allow servo pattern 234 to align in servo band 232 to within less than 10 micrometers. In some embodiments, lengths L1 and L2 are substantially equal such that servo pattern 234 will be substantially centered within servo track 232.

Various embodiments of the invention have been described. For example, numerous different configurations of time-based servo write heads in a servo writing apparatus have been described. In addition, accurate alignment of write gaps of the servo write heads to each other and to a mounting structure have been described. Moreover, an alignment relationship between a width of the mounting structure and a separation distance between the servo write heads has also been described. Nevertheless, various modifications may be made without departing from the scope of the invention. For example, additional modifications may be made to the presented servo write head configurations as long as write gap alignment accuracy is maintained. In addition, the servo writing apparatus may be designed with a mounting structure width and a servo write head separation distance outside of the ranges given herein.

Many of the embodiments described herein have been described with single channel heads. The same configurations, however, may also be used with multi-channel heads. In other words, any number of channels may be defined in the heads of any of the embodiments described above. These and other embodiments are within the scope of the following claims.

The invention claimed is:

1. A system comprising:
a servo writing apparatus that includes a first servo write head comprising a first write gap to substantially magnetize magnetic particles of magnetic tape in a first direction, and a second servo write head comprising one or more second write gaps arranged to define a time-based servo pattern magnetized in a second direction on the magnetic tape, wherein the first write gap and the second write gaps define a servo channel corresponding to a servo band on the magnetic tape; and
an alignment tool that translates and rotates the first and second servo write heads to substantially align the first write gap and the second write gaps in the servo channel to within less than 10 micrometers.

2. The system of claim 1, further comprising a shield between the first servo write head and the second servo write head.

3. The system of claim 1, wherein the time-based servo pattern defined by the one or more second write gaps substantially corresponds to one of an N-shaped pattern, a "/ \"-shaped pattern, a "\ /"-shaped pattern, a "< >"-shaped pattern, a "//// \\\\"-shaped pattern, a "\\\\ ////"-shaped pattern, and a "<<<< >>>>"-shaped pattern.

4. The system of claim 1, wherein the first servo write head comprises a plurality of first write gaps and the second servo write head comprises a plurality of second write gaps, and wherein each of the plurality of first write gaps aligns with corresponding second write gaps of the plurality of second write gaps to define a plurality of servo channels.

5. The system of claim 4, wherein each of the plurality of servo channels corresponds to a servo band and each of the plurality of servo channels is separated by a distance corresponding to at least a width of a data track, wherein the width of each of the data tracks is less than 18 micrometers and the width of each of the servo bands is less than 190 micrometers.

6. The system of claim 1, wherein the first servo write heed comprises a first coil controlled to provide a direct current (DC) magnetic field across the first write gap and the second servo write head comprises a second coil controlled to provide magnetic field pulses across the second write gaps.

7. The system of claim 1, wherein the first servo write head comprises a first core and the second servo write head comprises a second core, wherein the cores are bonded to each other.

8. The system of claim 1, wherein the second servo write head comprises a surface thin film that defines the second write gaps.

9. The system of claim 1, further comprising a mounting structure wherein the first and second servo write heads are mounted in the mounting structure.

10. The system of claim 9, wherein the mounting structure defines a width and the mounted first and second servo write heads define a separation distance, and wherein a ratio of the mounting structure width to the servo write head separation distance is greater than 2 to 1 and less than 50 to 1.

11. The system of claim 9, wherein the mounted first and second servo write heads define a separation distance greater than 0.7 millimeters and less than 20 millimeters.

12. A method comprising aligning a first write gap of a first servo write head that substantially magnetizes magnetic particles of magnetic tape in a first direction and one or more second write gaps of a second servo write head that are arranged to define a time-based servo pattern magnetized in a second direction on the magnetic tape by translating and rotating the first and second servo write heads, wherein the first write gap and the second write gaps define a servo channel corresponding to a servo band on the magnetic tape and the first write gap and the second write gaps are aligned in the servo channel to within less than 10 micrometers.

13. The method of claim 12, wherein aligning the first write gap and the second write gaps comprises aligning the second write gaps to a mount reference surface on a mounting structure and aligning the first write gap to the second write gaps and the mount reference surface.

14. The method of claim 13, further comprising using an alignment tool comprising a servo head holder and a microscope objective to individually align the second write gaps and the first write gap to the mount reference surface.

15. The method of claim 12, further comprising bonding the first servo write head and the second servo write head to each other once the first write gap and the second write gaps are aligned.

16. The method of claim 12, further comprising mounting the first servo write head and the second servo write head in a mounting structure once the first write gap and the second write gaps are aligned.

* * * * *